United States Patent Office 3,138,272
Patented June 23, 1964

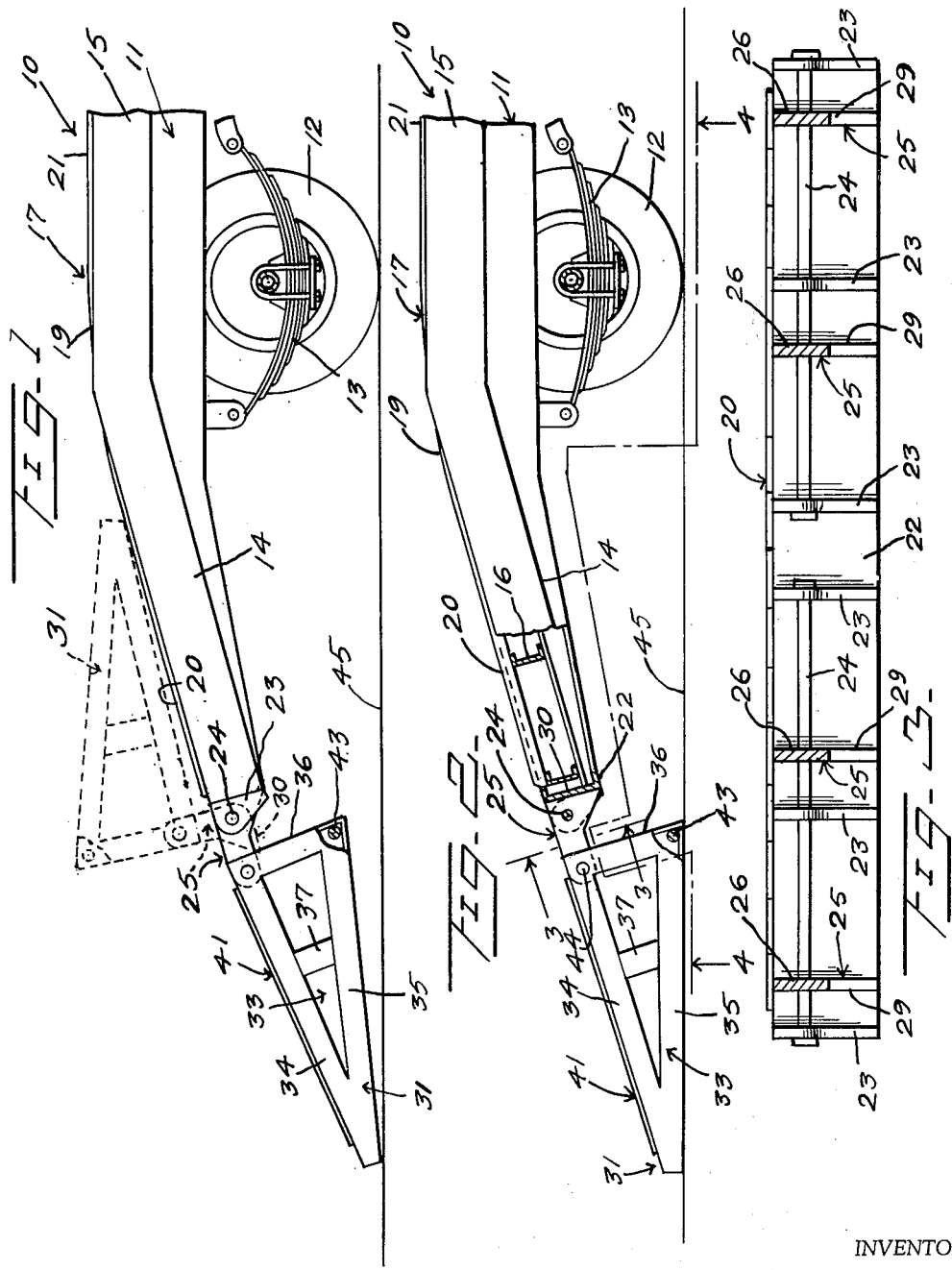

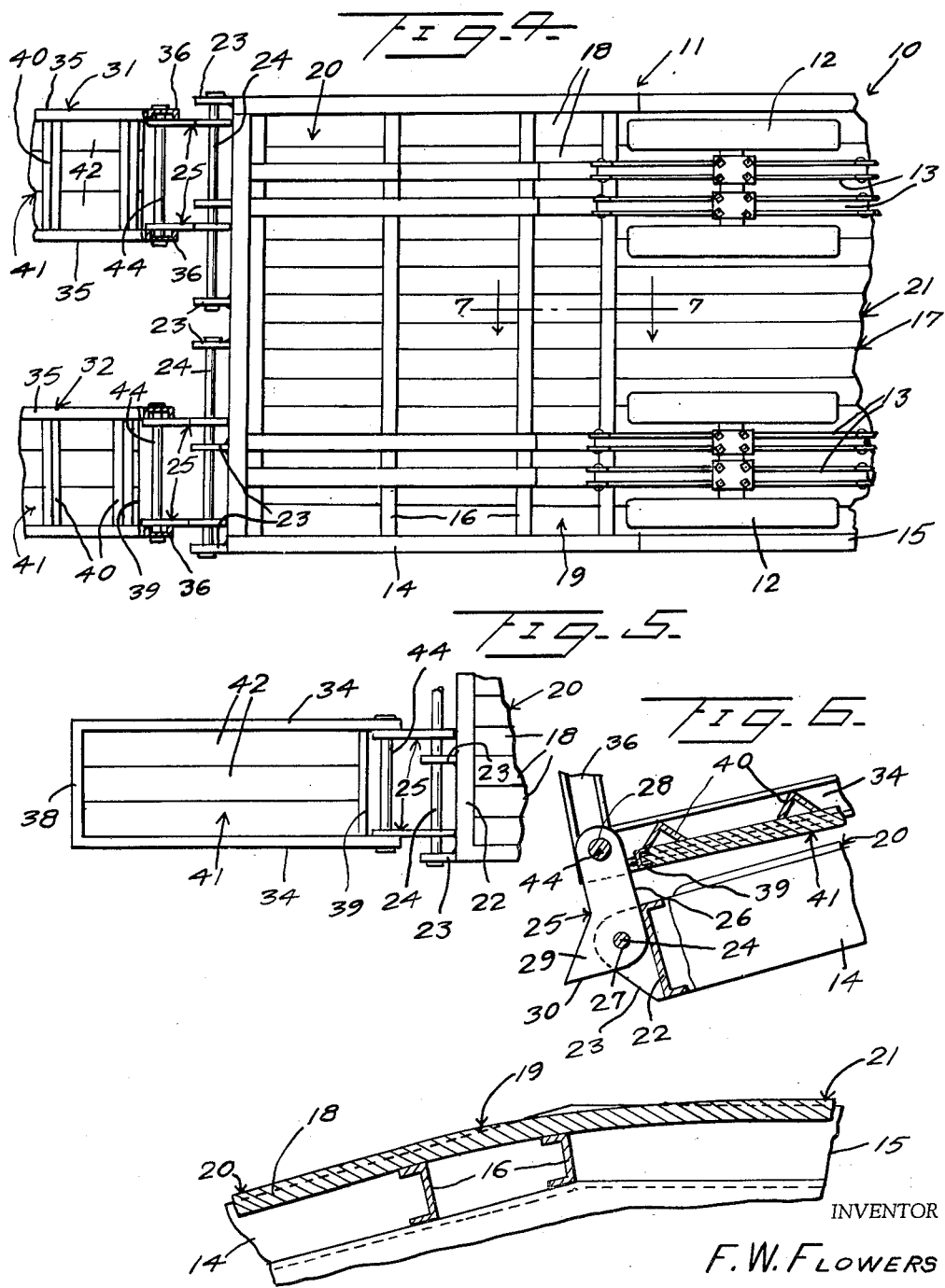

3,138,272
VEHICLE WITH LOADING RAMP
Francis W. Flowers, 4th and Lake Drive, Brooklawn, N.J.
Filed June 12, 1962, Ser. No. 201,934
8 Claims. (Cl. 214—85)

This invention relates to a vehicle for use in hauling tractors and other similar construction equipment, either the wheeled type or track-laying type, and which equipment is not designed for movement, under its own power, over highways between job locations.

More particularly, it is an object of the present invention to provide a vehicle having a novel ramp to facilitate loading a tractor thereon or unloading a tractor therefrom, and which is so constructed that loading and unloading operations can be accomplished with much greater safety than has previously been possible with other hauling vehicles equipped with a loading ramp.

More particularly, it is an object of the invention to provide a loading ramp which will be lowered by the weight of a piece of equipment being driven thereon or driven therefrom in such a manner as to reduce the angle of incline of the ramp so that the loading or unloading operation may be accomplished with greater safety.

Still a further object of the invention is to provide a hauling vehicle including a deck which is so constructed that a minimum rocking movement of a track-laying tractor will occur as said tractor is being driven onto or off of the hauling vehicle to thereby materially increase the safety with which such operations can be accomplished.

Various other objects and advantages of the invention will hereinafter become more fully apparent from the following description of the drawings, illustrating a presently preferred embodiment thereof, and wherein:

FIGURE 1 is a fragmentary side elevational view of an end of a hauling vehicle equipped with the loading and unloading ramp;

FIGURE 2 is a similar view, partly in longitudinal section, and showing a different position assumed by the hauling vehicle and loading ramp when a load is applied to the ramp;

FIGURE 3 is an enlarged transverse sectional view taken substantially along a plane as indicated by the line 3—3 of FIGURE 2;

FIGURE 4 is a fragmentary bottom plan view, taken substantially along the line 4—4 of FIGURE 2 and showing certain of the parts in section;

FIGURE 5 is a fragmentary top plan view of a part of the ramp;

FIGURE 6 is a fragmentary longitudinal sectional view, on an enlarged scale, showing a part of one of the ramp members in a folded position, and FIGURE 7 is a fragmentary longitudinal sectional view taken substantially along a plane as indicated by the line 7—7 of FIGURE 4, and on an enlarged scale.

Referring more specifically to the drawings, a portion of a hauling vehicle, designated generally 10, is illustrated, said vehicle preferably constituting a trailer and the part thereof, illustrated in the drawings, preferably constituting the rear end of the trailer. The vehicle 10 includes an elongated frame 11, supporting wheel assemblies 12, and suspension springs 13, connected to the wheel assemblies 12 and frame 11 for yieldably supporting the frame on the wheel assemblies. The frame 11 includes a downwardly inclined or sloping end portion 14, constituting the rear end of the frame 11, and which is disposed behind or in overhanging relation to the wheel assemblies 12. The remaining, forward portion of the frame 11, only a part of which is shown at 15, is normally disposed in substantially a horizontal plane.

The frame 11 includes a plurality of cross braces 16 which provide supports for the vehicle deck 17. The deck 17 extends from end-to-end of the frame 11 and is preferably composed of longitudinally extending planks 18 of oak or other hardwood. The planks or decking strips 18 are bowed so that the deck 17 includes a portion 19 which is convexly rounded on its upper side in a direction longitudinally of the deck and which joins the rear deck portion 20, which is disposed in the inclined rear frame portion 14, and the substantially horizontal forward deck portion 21 which is supported by and disposed in the forward frame portion 15.

The vehicle frame 11 includes a rear cross frame member 22, constituting the outer end of the sloping rear frame portion 14, and which is provided with two sets of outwardly or rearwardly projecting brackets 23, each including end brackets and an intermediate bracket, as best seen in FIGURE 3. A rod 24 extends through and is supported by each set of brackets 23 so that said rods 24 are located in transversely spaced aligned relation to one another crosswise of the vehicle frame 11 and behind and spaced from the rear frame member 22. Each rod 24 slidably and turnably supports a pair of rigid link members 25 which are located on opposite sides of the intermediate bracket 23, associated with said rod.

As best illustrated in FIGURE 6, each link 25 includes a bar portion 26 having spaced openings 27 and 28. The rod 24 extends through the opening 27 to turnably and slidably mount the link 25 thereon. The link 25 includes a portion 29 which extends generally laterally from one longitudinal edge of the end of the bar portion 26 in which the opening 27 is formed and which has a substantially straight outer edge 30 which is disposed substantially at a right angle to the axis of the bar portion 26. When the link member 25 is swung outwardly and downwardly relative to the frame end 22, from its position of FIGURE 6 to its position of FIGURE 2, the edge 30 thereof, which constitutes an abutment, moves into abutting engagement with the frame end 22 for supporting the link member 25 against further downward swinging movement and with its bar portion 26 disposed substantially parallel to the plane of the downwardly sloping frame end 14 or to the plane of the downwardly sloping deck portion 20.

A ramp member, designated generally 31, is pivotally connected to one of the pairs of link members 25, and a corresponding ramp member 32 is pivotally connected to the other pair of link members 25. Each ramp member includes corresponding spaced sides 33 each of which includes an inclined top member 34, a bottom member 35, an inner end member 36, and an intermediate brace 37. Said parts 34–37 are each of inwardly opening channel shape construction in cross section and may be integrally connected, secured together by welding, or rigidly joined in any other conventional manner. The inner end member 36 extends between inner spaced ends of the members 34 and 35, which members 34 and 35 extend in converging relation to one another from said member 36 to merge at their opposite outer ends. The members 34 and 35 are disposed at an acute angle to one another so that the frame sides 33 are wedge-shaped, as are the ramp members 31 and 32, as viewed in side elevation. The outer ends of the frame sides of each ramp member are rigidly connected to one another by an outer cross member 38 of inwardly opening channel shape cross section, and a cross member 39 connects the top frame members 34 of the two frame sides, near to but spaced slightly from the inner end members 36. Each ramp member includes a plurality of cross braces 40, as best seen in FIGURE 6, which extend between the top frame members 34 and have their ends suitably secured in the inwardly opening channels thereof.

A deck or platform 41, preferably composed of longitudinally extending oak or hardwood planks 42, is disposed on and secured to the braces 40 and extends between the cross members 38 and 39. A cross brace 43 extends between and is secured at its ends in the lower inner corners, formed by the bottom members 35 and the inner end members 36, and a rod 44 extends between and through the upper corners, formed by the upper ends of the end members 36 and the inner ends of the top members 34, said rod extending through the openings 28 of the pair of links 25, associated with said ramp member and having a sufficiently loose fitting engagement therewith to permit the ramp member to pivot relative to said link members.

Assuming that a piece of equipment, such as a tractor of the track-laying type, is to be loaded on the hauling vehicle 10, the two ramp members 31 and 32 are swung outwardly and downwardly relative to the ovrehanging frame end 14, as seen in full lines in FIGURE 1 and in FIGURE 5. Since the link members 25 have sliding engagement on the rods 24, the ramp members 31 and 32 can be adjusted toward or away from one another to align said ramp members with the treads or wheels of the tractor to be loaded. With the parts in the positions as shown in full lines in FIGURE 1, the tractor is moved from left to right toward the ramp members 31 and 32. As the treads of the tractor, not shown, move onto the inclined decks 41 of the ramp members, the weight of the tractor will force the ramp members downwardly and will cause said ramp members to rock slightly in a clockwise direction, as seen in FIGURE 1, relative to the link members 25 thereof, which are prevented from swinging downwardly by their abutments 30 engaging the frame end 22. Accordingly, the ramp members 31 and 32 will yield downwardly until their bottom bars 35 come to rest flush upon the ground 45 or other supporting surface of the vehicle 10, as illustrated in FIGURE 2. This will materially reduce the angle of incline between the ramp decks 41 and the surface 45, so that the tractor can more readily travel up the ramp members. Likewise, since the link members 25 are prevented from swinging downwardly, as the ramp members are displaced downwardly from their raised positions of FIGURE 1 to their lowered positions of FIGURE 2, the weight of the load on said ramp members will depress the overhanging rear end 14 of the frame as the springs 13 yield to allow the frame 11 to be depressed from its position of FIGURE 1 to its position of FIGURE 2. This will likewise reduce the angle of incline between the surface 45 and the deck portion 20, which will be disposed substantially coplanar with the ramp decks 41 when the ramp members and vehicle frame have been lowered. Accordingly, the tractor can then be more readily and more safely driven up the inclined deck portion 20 after passing over the ramp decks 41. The convexly rounded deck portion 19 will prevent or minimize a rocking movement of the tractor relative to the vehicle 10 as the preponderance of the weight of the tractor reaches a position over the forward deck portion 21 and onto which deck portion it subsequently moves.

When the tractor is in a fully loaded position on the deck portion 21, the ramp members 31 and 32 are swung upwardly and inwardly with and relative to their link members 25 to their folded positions, as seen in dotted lines in FIGURE 1 and in FIGURE 6, overlying and resting upon the inclined rear deck portion 20 and in inverted positions, so that the ramp members then provide chocks on which a shovel or other implement of the tractor may rest while the hauling vehicle is in transit.

It will also be apparent that as the tractor is being unloaded and moves rearwardly of the wheel assemblies 12, the weight thereof will depress the rear end of the vehicle frame 11, from the position thereof as shown in FIGURE 1 and which corresponds substantially to the position of the frame during transport and when the ramp members are in their folded, dotted line positions, to the lowered loading and unloading position of the frame 11, as seen in FIGURE 2. Thus, the angle of inclination of the deck portion 20 and ramp decks 41 will be reduced during unloading as well as during loading of the vehicle 10.

Various modifications and changes are contemplated and may be resorted to, without departing from the function or scope of the invention as hereinafter defined by the appended claims.

I claim as my invention:

1. A vehicle comprising an elongated frame, ground wheel assemblies, spring suspension means yieldably supporting the frame on said wheel assemblies, a deck supported on and extending from end-to-end of the frame, said frame having a downwardly sloping overhanging end, a ramp member disposed beyond and forming an extension of said overhanging end, means connecting an inner end of said ramp member to said overhanging frame end for swinging and rocking movement of the ramp member relative to the frame about two spaced substantially parallel axes disposed crosswise of the frame, said means normally supporting said ramp member with an outer end only thereof resting on the ground and with an upper surface thereof disposed nearly coplanar with the deck portion of said overhanging frame end, said ramp member having a bottom surface disposed at an acute angle to said upper surface and at an incline relative to the ground when the ramp member is supported by said means and said outer end, said means accommodating swinging movement of the ramp member relative to said means and to said frame end to allow the ramp member to rock in a direction for decreasing the inclination of its top surface and to cause said bottom surface to assume a position in flush engagement with the ground when said spring suspension means yields in response to a pressure on the deck or on the upper surface of the ramp member for decreasing the inclination of said deck portion thereof and to retain said deck portion substantially coplanar with the top surface of the ramp member.

2. A vehicle comprising an elongated frame, ground wheel assemblies, spring suspension means yieldably supporting the frame on said wheel assemblies, a deck supported on and extending from end-to-end of the frame, said frame having a downwardly sloping overhanging end, a ramp member disposed beyond and forming an extension of said overhanging end, means connecting an inner end of said ramp member to said overhanging frame end for swinging and rocking movement of the ramp member relative to the frame about two spaced substantially parallel axes disposed crosswise of the frame, said means normally supporting said ramp member with an outer end only thereof resting on the ground and with an upper surface thereof disposed nearly coplanar with the deck portion of said overhanging frame end, said means accommodating swinging movement of the ramp member relative to said means and to said frame end when said spring suspension means is depressed to allow the ramp member to fulcrum about said outer end thereof and rock in a direction for decreasing the inclination of its top surface to cause a part of the inner end of the ramp member to assume a position in engagement with the ground.

3. A vehicle as in claim 2, said means comprising rigid link members swingably connected to said frame end about an inner one of said axes and to which an inner and upper portion of the ramp member is pivotally connected about the other outer axis for swinging movement relative to the link members through an arc greater than 180°.

4. A vehicle as in claim 2, said means comprising link members each including an abutment disposed between said inner axis and said frame end, when the link member is swung downwardly and outwardly, and which abutment engages said frame end for supporting the link member against further downward swinging movement to normally support the inner end of the ramp in an elevated position.

5. A vehicle as in claim 4, said link members being swingable upwardly and inwardly about said inner axis and said ramp member being swingable upwardly and inwardly of the frame about said outer axis for positioning the ramp member in a folded position overlying and resting on said overhanging frame end.

6. A vehicle as in claim 2, said means comprising rigid link members swingably connected to said frame end about an inner one of said axes and to which an inner and upper portion of the ramp member is pivotally connected about the other outer axis, a second ramp member, a second pair of link members connecting said second ramp member to said frame end in laterally spaced relation to the first mentioned ramp member, the inner axes of said link members comprising rods on which the link members are slidably and turnably mounted for displacing said ramp members toward and away from one another transversely of said frame end.

7. A vehicle as in claim 2, said deck including a convexly rounded longitudinally extending portion located between the deck portion of said overhanging frame end and the remaining, substantially horizontal, portion of the deck.

8. A vehicle as in claim 7, said deck comprising a plurality of longitudinally extending hardwood planks.

References Cited in the file of this patent

UNITED STATES PATENTS

| | | |
|---|---|---|
| 2,431,436 | Townsend | Nov. 25, 1947 |
| 2,436,467 | Winter | Feb. 24, 1948 |
| 2,437,479 | Price | Mar. 9, 1948 |
| 2,452,789 | Pike | Nov. 2, 1948 |
| 2,486,189 | McCormick | Oct. 25, 1949 |
| 2,587,265 | Wright | Feb. 26, 1952 |
| 2,900,094 | Ferguson | Aug. 18, 1959 |
| 2,966,274 | Price | Dec. 27, 1960 |